(12) United States Patent
Hart et al.

(10) Patent No.: US 11,263,049 B2
(45) Date of Patent: Mar. 1, 2022

(54) SYSTEM FOR PATTERN RECOGNITION TO CUSTOMIZED RESOURCE USAGE

(71) Applicant: BANK OF AMERICA CORPORATION, Charlotte, NC (US)

(72) Inventors: Susan R. Hart, Addison, TX (US); Christopher Daniel Birch, Dayton, OH (US); Kelly Renee-Drop Keiter, Waxhaw, NC (US); Lisa Matthews, Charlotte, NC (US); Cody Dean Searl, Pineville, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 62 days.

(21) Appl. No.: 16/861,523

(22) Filed: Apr. 29, 2020

(65) Prior Publication Data

US 2021/0342187 A1    Nov. 4, 2021

(51) Int. Cl.
| | |
|---|---|
| *G06F 9/50* | (2006.01) |
| *G06N 5/00* | (2006.01) |
| *G06N 20/00* | (2019.01) |
| *G06F 11/30* | (2006.01) |
| *G06N 5/04* | (2006.01) |
| *G06N 5/02* | (2006.01) |

(52) U.S. Cl.
CPC ............. *G06F 9/5005* (2013.01); *G06F 9/50* (2013.01); *G06F 11/30* (2013.01); *G06N 5/00* (2013.01); *G06N 5/02* (2013.01); *G06N 5/025* (2013.01); *G06N 5/04* (2013.01); *G06N 5/046* (2013.01); *G06N 5/047* (2013.01); *G06N 20/00* (2019.01)

(58) Field of Classification Search
CPC ............ G06N 20/00; G06N 5/00; G06N 5/02; G06N 5/025; G06N 5/04; G06N 5/046; G06N 5/047; G06F 9/50; G06F 9/5005; G06F 11/30

See application file for complete search history.

(56) References Cited

U.S. PATENT DOCUMENTS

| | | |
|---|---|---|
| 8,417,584 B2 | 4/2013 | Ross |
| 8,715,178 B2 | 5/2014 | Price et al. |
| 9,177,307 B2 | 11/2015 | Ross et al. |
| 9,754,318 B1 | 9/2017 | Spies et al. |

(Continued)

*Primary Examiner* — Charles M Swift
(74) *Attorney, Agent, or Firm* — Moore & Van Allen PLLC; James C. Edwards (57) ABSTRACT

Resource event patterns are identified in previously conducted resource events based on historical resource event data and, in some embodiments, pending and/or previous resource event request data. Specifically, the resource event patterns indicate a timing pattern for when resource events included in the pattern are conducted. Based at least on the timing pattern, an optimal time or time period is determined for communicating a notification to the user that is configured to notify a user that a next occurrence of a time within the timing pattern is imminent and that a resource event within the resource event pattern is pending. The optimal time may be close in proximity of the next occurrence of the time within the timing pattern or, depending on other factors, such as user preference, resource volume due, resource volume availability, resource volume due in comparison to typical resource volume due, the optimal time may be farther out from the next occurrence of a time within the timing pattern.

19 Claims, 4 Drawing Sheets

(56) References Cited

U.S. PATENT DOCUMENTS

| | | |
|---|---|---|
| 10,210,569 B1 | 2/2019 | Kim et al. |
| 2006/0218278 A1* | 9/2006 | Uyama ............... H04L 41/5064 |
| | | 709/226 |
| 2012/0296768 A1 | 11/2012 | Fremont-Smith et al. |
| 2014/0164057 A1 | 6/2014 | Wen et al. |
| 2014/0244503 A1 | 8/2014 | Sadlier |
| 2014/0330505 A1* | 11/2014 | Wenneman .......... G08G 1/0129 |
| | | 701/117 |
| 2017/0126581 A1* | 5/2017 | Wadley .................... H04L 47/76 |
| 2017/0195994 A1 | 7/2017 | Cole et al. |
| 2019/0213506 A1* | 7/2019 | Greenberger .......... G06Q 10/02 |
| 2020/0074323 A1* | 3/2020 | Martin .................. G06F 9/5061 |
| 2020/0336506 A1* | 10/2020 | Levin ................. H04L 63/1425 |
| 2021/0073909 A1* | 3/2021 | Le Roux ................. G06N 20/00 |

\* cited by examiner

SYSTEM FOR PATTERN RECOGNITION TO CUSTOMIZED RESOURCE USAGE

FIELD OF THE INVENTION

The present invention relates to managing resource events and, more specifically, providing for resource event pattern recognition for purposes of prompting impending resource events that comply to the resource event pattern.

BACKGROUND

A need exists to develop systems, methods, computer program products and the like that manage the resource events. Specifically, a need exists to provide resource event pattern recognition, specifically patterns that indicate specific timing patterns for conducting resource event within such patterns for purposes of subsequently notifying users, prior to a next occurrence of time within the timing pattern, that resource event that meets resource event pattern is pending.

SUMMARY OF THE INVENTION

The following presents a simplified summary of one or more embodiments in order to provide a basic understanding of such embodiments. This summary is not an extensive overview of all contemplated embodiments and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing systems, computer-implemented methods, computer program products and the like that identify patterns in previously conducted resource events, specifically patterns that indicate a timing pattern for conducting resource events. Based at least on the timing pattern, the present invention determines an optimal time for communicating a notification to the user that is configured to notify a user that a next occurrence of a time within the timing pattern is imminent and that a resource event within the resource event pattern is pending. The optimal time may be close in proximity (e.g., within one day) of the next occurrence of the time within the timing pattern or, depending on other factors, such as user preference, resource volume due, resource volume availability, resource volume due in comparison to typical resource volume due, the optimal time may be farther out from the next occurrence of a time within the timing pattern.

A system for resource event pattern recognition for prompting impending resource event requests defines first embodiments of the invention. The system includes a first computing platform having a first memory and at least one first processing device in communication with the first memory. The first memory stores historical resource event data for each of a plurality of users. The system additionally includes a second computing platform having a second memory and at least one second processing device in communication with the second memory. The second memory stores instructions that are executable by the second processing device. The second instructions are configured to access the first memory to retrieve historical resource event data for one of the plurality of users and analyze the historical resource event data to determine a resource event pattern associated with the user. The resource event pattern is defined by (i) resource events conducted with a same resource recipient, and (ii) a timing pattern for when the resource events are conducted with the resource recipient. The instructions are further configured to determine an optimal time period prior to a next occurrence of a time within the timing pattern for communicating a first electronic communication to the user. The first electronic communication is configured to provide the user notice of (i) the next occurrence of the time within the timing pattern, and (ii) an impending resource event with the resource recipient. In addition, the instructions are configured to generate and communicate, within the optimal time period, the first electronic communication to the user.

In specific embodiments of the system, the instructions configured to determine are further configured to determine the optimal time period prior to the next occurrence of the time within the timing pattern for communicating a first electronic communication to the user. The optimal time period is within one day prior to the next occurrence of the time within the timing pattern.

In further specific embodiments of the system, the instructions configured to analyze are further configured to analyze the historical resource event data to determine the resource event pattern associated with the user, in which, the resource event pattern is defined further by (iii) the resource events being within a resource volume range. In such embodiments of the system, the first electronic communication is further configured to provide the user notice of (iii) the resource volume range.

In additional specific embodiments the system further includes a third computing platform having a third memory and at least one third processing device in communication with the third memory. The third memory stores resource event request data for each of the plurality of users. In further related embodiments of the system, the instructions are further configured to access the third memory to retrieve resource event request data for the user and determine, from the resource event request data, one or more resource event requests for resource events between the user and the resource recipient. In such related embodiments of the system, the instructions configured to analyze are further configured to analyze the historical resource event data and the one or more resource event requests to determine the timing pattern for the resource event pattern. In other related embodiments of the system, the instructions are further configured to (i) access the third memory to retrieve resource event request data for the user, (ii) determine, from the resource event request data, an impending resource event request for an upcoming resource event to be conducted between the user and the resource recipient, and (iii) determine a volume of resources requested for transfer in the impending resource event request. In such embodiments of the system, first electronic communication is further configured to provide the user notice of (iii) the volume of resources requested for transfer in the impending resource event request. In further related embodiments of the system the instructions configured to analyze are further configured to analyze the historical resource event data to determine the resource event pattern associated with the user. The resource event pattern is defined further by (iii) the resource events being within a resource volume range. In such embodiments of the system, the instructions are further configured (i) access the third memory to retrieve resource event request data for the user, (ii) determine, from the resource event request data, an impending resource event request for a resource event to be conducted between the user and the resource recipient, and (iii) determine that a volume of resources requested for transfer in the impending resource event request is outside of the resource volume range. In such embodiments of the system, the first electronic communication is further configured to provide the user notice of (iii) the volume of resources requested for transfer in the impending resource event request is outside of the resource volume range.

Moreover, in further specific embodiments, the instructions are further configured to (i) determine that the next occurrence of the time within the timing pattern has lapsed without the user conducting a resource event with the resource recipient, and (ii) generate a second electronic communication and communicate the second electronic communication to the user. The second electronic communication is configured to notify the user that the time within the timing pattern has lapsed without the user conducting the resource event with the resource recipient.

A computer-implemented method for resource event pattern recognition for prompting impending resource event requests defines second embodiments of the invention. The computer-implemented method is executable by one or more processing devices. The computer-implemented method includes retrieving historical resource event data for one of a plurality of users and analyzing the historical resource event data to determine a resource event pattern associated with the user. The resource event pattern is defined by (i) resource events conducted with a same resource recipient, and (ii) a timing pattern for when the resource events are conducted with the resource recipient. The computer-implemented method further includes determining an optimal time period prior to a next occurrence of a time within the timing pattern for communicating a first electronic communication to the user. The first electronic communication is configured to provide the user notice of (i) the next occurrence of the time within the timing pattern, and (ii) an impending resource event with the resource recipient. In addition, the computer-implemented method includes generating and communicating, within the optimal time period, the first electronic communication to the user.

In further specific embodiments of the computer-implemented method, determining further includes determining the optimal time period prior to the next occurrence of the time within the timing pattern for communicating a first electronic communication to the user. The optimal time period is within one day prior to the next occurrence of the time within the timing pattern.

In other specific embodiments of the computer-implemented method, analyzing further includes analyzing the historical resource event data to determine the resource event pattern associated with the user. The resource event pattern is defined further by (iii) the resource events being within a resource volume range and the first electronic communication is further configured to provide the user notice of (iii) the resource volume range.

In further specific embodiments the computer-implemented method includes retrieving resource event request data for the user and determining, from the resource event request data, one or more resource event requests for resource events between the user and the resource recipient. In such embodiments of the computer-implemented method, analyzing further includes analyzing the historical resource event data and the one or more resource event requests to determine the timing pattern for one or more of the resource event patterns.

In still further specific embodiments the computer-implemented method includes (i) retrieving resource event request data for the user, (ii) determining, from the resource event request data, an impending resource event request for an upcoming resource event to be conducted between the user and the resource recipient, and (iii) determining a volume of resources requested for transfer in the impending resource event request. In such embodiments of the computer-implemented method, the first electronic communication is further configured to provide the user notice of (iii) the volume of resources requested for transfer in the impending resource event request.

Moreover, in further embodiments of the computer-implemented method analyzing includes analyzing the historical resource event data to determine the resource event pattern associated with the user. The resource event pattern is defined further by (iii) the resource events being within a resource volume range. In such embodiments the computer-implemented method further includes (i) retrieving resource event request data for the user, (ii) determining, from the resource event request data, an impending resource event request for an upcoming resource event to be conducted between the user and the resource recipient, and (iii) determining that a volume of resources requested for transfer in the impending resource event request is outside of the resource volume range. In such embodiments of the computer-implemented method, the first electronic communication is further configured to provide the user notice of (iii) the volume of resources requested for transfer in the impending resource event request is outside of the resource volume range.

A computer program product including non-transitory computer-readable code defines second embodiments of the invention. The computer-readable code includes a first set of codes for causing a computer processing device to retrieve historical resource event data for one of a plurality of users. Additionally, the computer-readable code includes a second set of codes for causing a computer processing device to analyze the historical resource event data to determine a resource event pattern associated with the user. The resource event pattern is defined by (i) resource events conducted with a same resource recipient, and (ii) a timing pattern for when the resource events are conducted with the resource recipient. Further, the computer-readable code includes a third set of codes for causing a computer processing device to determine an optimal time period prior to a next occurrence of a time within the timing pattern for communicating a first electronic communication to the user. The first electronic communication is configured to provide the user notice of (i) the next occurrence of the time within the timing pattern, and (ii) an impending resource event with the resource recipient. In addition, the computer-readable code includes a fourth set of codes for causing a computer to generate and communicate, within the optimal time period, the first electronic communication to the user.

In specific embodiments of the computer program product, the third set of codes are further configured to cause the computer processing device to determine the optimal time period prior to the next occurrence of the time within the timing pattern for communicating a first electronic communication to the user. The optimal time period is within one day prior to the next occurrence of the time within the timing pattern.

In further specific embodiments of the computer program product, the second set of codes is further configured to cause the computer processing device to analyze the historical resource event data to determine the resource event pattern associated with the user. In such embodiments, the resource event pattern is defined further by (iii) the resource events being within a predetermined resource volume range and the electronic communication is further configured to provide the user notice of (iii) the resource volume range.

In additional specific embodiments of the computer program product, the computer-readable code further includes a fourth set of codes for causing a computer processing device to retrieve resource event request data for the user and a fifth set of codes for causing a computer processing device to determine, from the resource event request data, one or more resource event requests for resource events between the user and the resource recipient. In such embodiments of the computer program product, the second set of codes is further configured to cause the computing processing device to analyze the historical resource event data and the one or more resource event requests to determine the timing pattern for one or more of the resource event patterns.

Thus, systems, apparatus, methods, and computer program products herein described in detail below provide for identifying patterns in previously conducted resource events, specifically patterns that indicate a timing pattern for conducting resource events. Based at least on the timing pattern, an optimal time/time period is determined for communicating a notification to the user that is configured to notify a user that a next occurrence of a time within the timing pattern is imminent and that a resource event within the resource event pattern is pending. The optimal time may be close in proximity (e.g., within one day) of the next occurrence of the time within the timing pattern or, depending on other factors, such as user preference, resource volume due, resource volume availability, resource volume due in comparison to typical resource volume due, the optimal time may be farther out from the next occurrence of a time within the timing pattern.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Having thus described embodiments of the invention in general terms, reference will now be made the accompanying drawings, wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one of skill in the art in view of this disclosure, the present invention may be embodied as an apparatus (e.g., a system, computer program product, and/or other device), a method, or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer-readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted or unscripted programming language such as JAVA, PERL, SMALLTALK, C++ or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or apparatuses (the term "apparatus" including systems and computer program products). It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus to cause a series of operational events to be performed on the computer or other programmable apparatus to produce a computer implemented process such that the instructions, which execute on the computer or other programmable apparatus, provide events for implementing the functions/acts specified in the flowchart and/or block diagram block or blocks. Alternatively, computer program implemented events or acts may be combined with operator or human implemented events or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Thus, embodiments of the invention provide for identifying patterns in previously conducted resource events, specifically patterns that indicate a timing pattern for conducting resource events. Based at least on the timing pattern, the present invention determines an optimal time for communicating a notification to the user that is configured to notify a user that a next occurrence of a time within the timing pattern is imminent and that a resource event within the resource event pattern is pending. The optimal time may be close in proximity (e.g., within one day) of the next occurrence of the time within the timing pattern or, depending on other factors, such as user preference, resource volume due, resource volume availability, resource volume due in comparison to typical resource volume due, the optimal time may be farther out from the next occurrence of a time within the timing pattern.

In specific embodiments of the invention, the resource event patterns are determined based on historical resource event data and, in some embodiments, historical and/or current resource event requests. In those embodiments of the invention, in which current/impending resource event request data is used, determinations are made as to the volume of resources required for the current/pending resource event and whether the current volume of resources varies from the range of volume of resources in the resource events included in the pattern. Such information may be used to determine the optimal time/time period and/or included in the notification communicated to the user.

In additional embodiments of the invention a determination may be made that the next occurrence of a time within the time pattern has lapsed without the user conducting the pending resource event. In such embodiments of the invention, another electronic notification may be generated and communicated to the user that notifies the user that the next occurrence of a time within the time pattern has lapsed without the user conducting the pending resource event.

Figure 1:
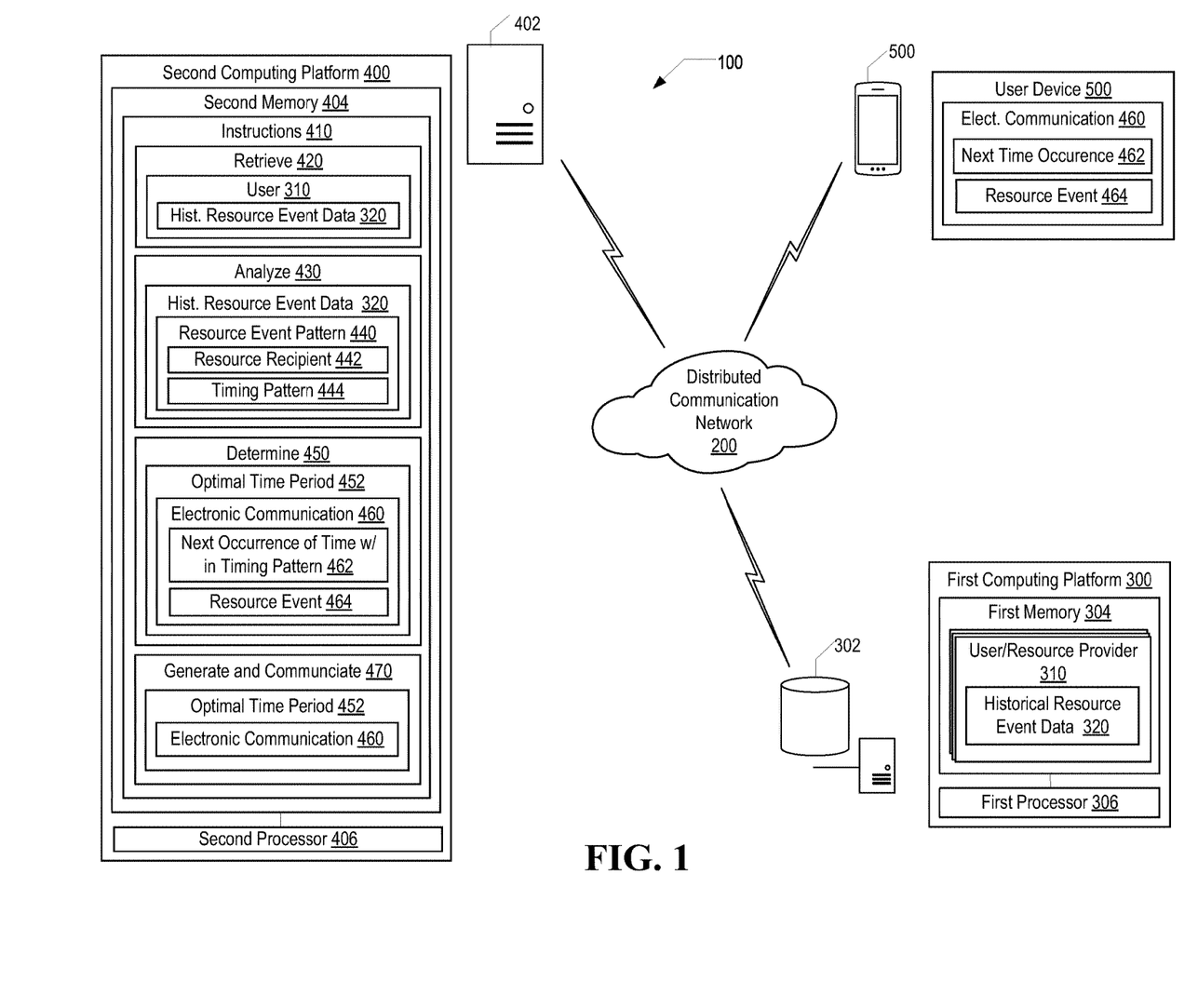
FIG. 1 is a schematic diagram of a system for resource event pattern recognition for prompting impending resource event requests, in accordance with embodiments of the present invention.

FIG. 1 is a schematic diagram of a system 100 configured for resource event pattern recognition for prompting impending resource event requests, in accordance with embodiments of the present invention. The system implements a distributed communication network 200, such as, but not limited to, the Internet, one or more intranets, a cellular network, a or the like.

The system 100 includes a first computing platform 300, which may comprise one or more computing devices/apparatus, such as database server 302 or the like. The first computing platform 300 having a first memory 304 and one or more first processors 306 (i.e., processing device) in communication with the first memory 304. The first memory 304 stores historical resource event data 320 for a plurality of users 310 (otherwise referred to herein as resource providers 310). The historical resource event data 320 includes data related to previous resource events conducted by the user, such data 320 includes, but is not limited to, resource event date, resource recipient, resource volume, objects associated with the resource event and the like. In specific embodiments of the invention, in which the resource event is a transaction conducted between a user (i.e., purchaser/payor) and supplier (i.e., merchant or the like), the data 320 may include, but is not limited to, transaction date, merchant/supplier, transaction amount, items/services in the transaction and corresponding item/service amounts and the like.

System 100 additionally includes a second computing platform 400, which may comprise one or more computing devices/apparatus, such as server 402 or the like. The first computing platform 400 having a second memory 404 and one or more second processors 406 (i.e., processing device) in communication with the second memory 404. The second memory 404 stores instructions 430 that are executable by the second processor(s) 406 and configured to access the first memory 304 of first computing platform 300 to retrieve 420 historical resource event data 320 associated with one of the plurality of users 310. The instructions are further configured to analyze 430 the historical resource event data 320 to determine at least one resource event pattern 440 associated with the user. Analysis may include implementation of Artificial Intelligence (AI) including Machine Learning (ML) techniques to recognize resource event patterns 440 in the historical resource event data 320. The resource event pattern is defined by the resource events in the pattern 440 being conducted with a same resource recipient 442 and a timing pattern 444 for when the resource events are conducted with the resource recipient.

In those specific embodiments of the system in which the resource event is a transaction, the resource event pattern 442 is a transaction pattern, the same resource recipient 442 is a same supplier/merchant/payee and the timing pattern 444 denotes when the transactions within the pattern are conducted. For example, a resource event pattern 442 may having timing pattern 444 that indicates that the user always conducts a recurring transaction on the day that the payment is due, seven days prior to the day that the payment is due, on a specific day of the week/month or the like (e.g., a specific date or a specific occurrence of a day of the week) or the like.

Instructions 410 are further configured to determine 450 an optimal time period 452 or specific time prior to the next occurrence of a time within the timing pattern for communicating a first electronic communication 460 to the user 310. The first electronic communication 460 is configured to notify the user 310 of the next occurrence of time 462 within the timing pattern and an impending resource event 464 that meets the criteria of the resource event pattern 440. For example, in those embodiments of the system in which the resource event is a transaction, the electronic communication 460, which may comprise an alert, such as a Short message Service (SMS)/text message, an electronic mail (email), voice mail or the like may notify the user/purchaser/payor of the impending transaction and that the user typically conducts the transaction on specific date or a specific number of days prior to the due date for the transaction/ payment or the like. In such embodiments of the invention the optimal time period 452 may be a time period during which the electronic communication 460 may be most effective in notifying the user of the impending transaction and the date on which they typically conduct the transaction. For example, if the user typically remits payment to a utility company or the like seven days before the payment is due, the optimal time period 452 for communicating the electronic communication 460 may be within one day of the date on which the user typically conducts the transaction (e.g., eight days before the payment is due or the like). In other instances, user inputs/suggestions as to when they desire the electronic notifications 460 may factor in or be the overriding factor in determining the optimal time period 452. Moreover, in certain instances the optimal time period 452 may be within a specified day/week/month or the like, while in other instances the optimal time period 452 may be within a specified hour or period of hours within a specified day or the like. Other factors for determining the optimal time period may include, but are not limited to, current volume of resources required for the impending resource event 464, volume of resources currently available to the user and the like. For example, a user may desire more lead time between they receive the electronic communication 460 and when they typically conduct such a resource event if the volume of resources required for the impending resource event 464 is higher than normal and/or the volume of resources currently available to the user is less than the volume of resources required for the impending resource event 464.

In further specific embodiments of the invention, the instructions 410 are configured to determine 450, from the impending/current resource event request, the volume of resources 482 requested/required for conducting the event and, in such embodiments in which the volume of resources 482 is determined, whether the volume of resources 482 is outside of the resource volume range 484. In such embodiments of the invention, the first electronic communication 460 may be further configured to notify the user of the volume of resources 482 and/or the that the volume of resources is outside of the resource volume range 484. For example, in those embodiments of the invention, in which the resource event is a financial transaction, the instructions 410 are configured to determine 450, from a current bill/payment request, the amount due and, in some embodiments, whether the amount due is outside of the amount range of other transactions in the identified pattern (e.g., the amount due is higher than the amount range of the other transactions in the identified pattern). Such information may not only be configured to be included in the electronic communication 460 (e.g., notifying the user of the amount due and whether the amount due exceeds the range of previous payments), but also may be used as determinative factors in determining the optimal time period 452 for communicating the electronic communication 460 to the user 310.

Additionally, instructions 460 may be configured to determine that the next occurrence of time 490 within the timing pattern 444 has lapsed 492 without the impending resource event having been conducted. For example, in those embodiments in which the resource event is a financial transaction, the instructions 460 may determine that the user failed to make payment according to the pattern (i.e., the user typically pays seven days in advance of the due date and it is currently six days in advance and the user has yet to pay).

Further, instructions 450 are configured to generate and communicate 470, within the optimal time period 452, the electronic communication 460, which is received by user device 500, which may be a mobile communication device, personal computing device or the like.

Figure 2:
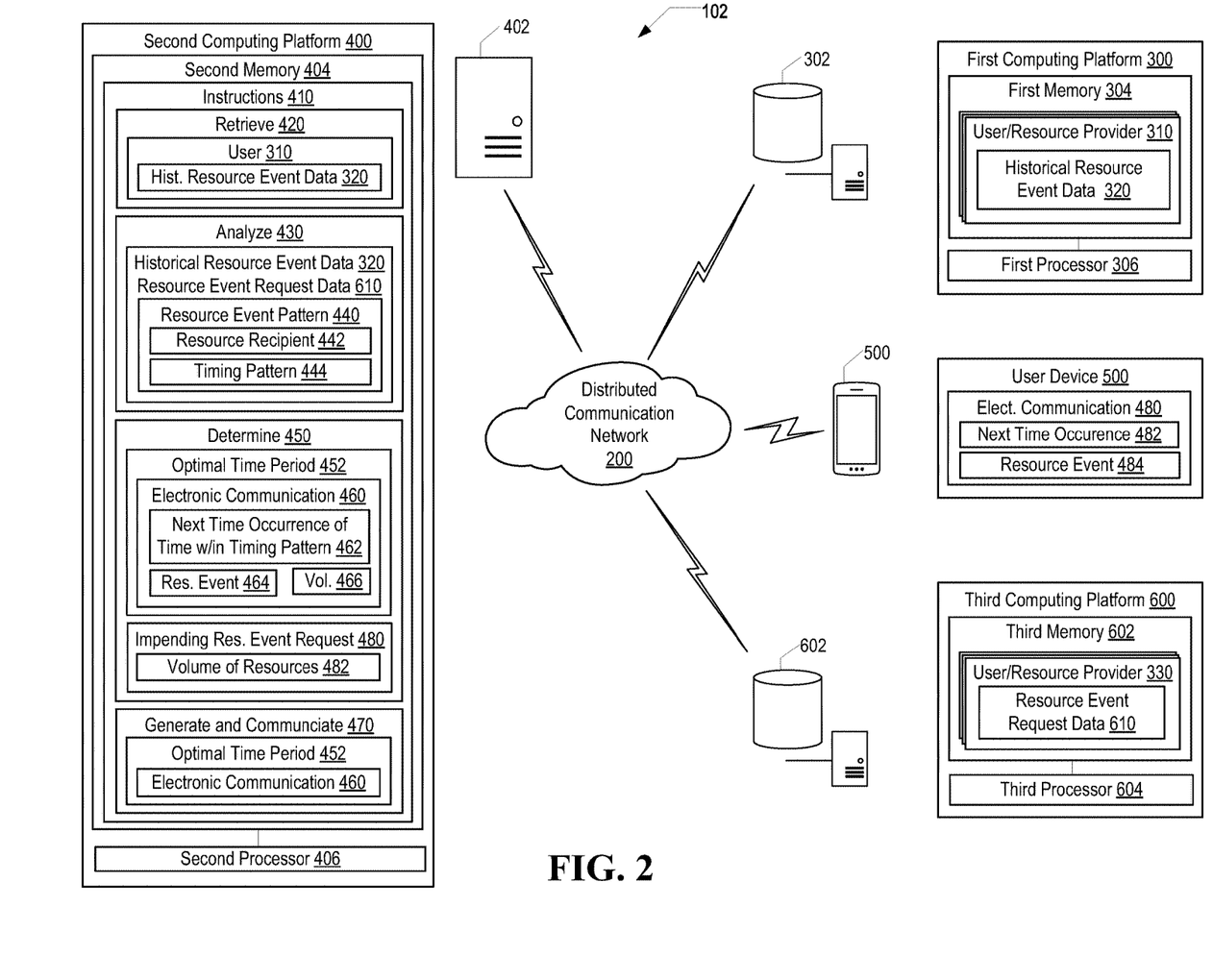
FIG. 2 is a schematic diagram of an alternate system for resource event pattern recognition for prompting impending resource event requests, in accordance with embodiments of the present invention.

Referring to FIG. 2 a schematic diagram is depicted of alternate system 102 for resource event pattern recognition for prompting impending resource event requests, in accordance with alternate embodiments of the present invention. In accordance with the embodiments described in relation to FIG. 2, the system 102 includes a third computing platform 600, which may comprise one or more computing devices/apparatus, such as database server 602. The third computing platform 600 includes third memory 602 that is in communication with one or more processors 604 (i.e., processing devices). The third memory 602 stores resource event request data 610 for a plurality of users 330. The resource event request data 610 may include, but is not limited to, resource requester/recipient, user/resource provider, a date for completing the resource event, volume of resources requested/required and the like. In specific embodiments of the system, in which the resource event is a transaction, the resource event request data 610 includes data associated with historical/previous and/or current/pending bills or payment demands from a merchant/supplier/payee (e.g., resource recipient) to the user/payor/buyer (e.g., resource provider). In such embodiment of the system 102, the resource event request data 610 includes, but is not limited to, the merchant/supplier/payee, the user/buyer/payor, the payment due date, the amount of the payment requested or required and the like. The third computing platform 600 and, more specifically, the resource event request data 610 may be maintained/controlled by individual resource recipients (e.g., merchants/suppliers/payees or the like), the user (e.g., resource provider/buyer or the like) or any other entity Further, according to the embodiments of the system 102 described in relation to FIG. 2, instructions 410 of second computing platform 400 are configured to access/retrieve 420 both the historical resource event data 430 and the resource event request data 610 and analyze 430 both the historical resource event data 430 and the resource event request data 610 to determine at least one resource event pattern 440 associated with the user. As previous discussed, analysis may include implementation of AI including ML techniques to recognize resource event patterns 440 based on the historical resource event data 320 and the resource event request data 610. Similar, to resource event pattern 440 discussed in relation to FIG. 1, the resource event pattern 440 is defined by the resource events in the pattern 440 being conducted with a same resource recipient 442 and a timing pattern 444 for when the resource events are conducted with the resource recipient.

The instructions 410 configured to determine 450 the optimal time period 452 for communicating the electronic communication 460 may further base the determination on information included in the resource event request data 610, such as, but not limited to, the due date for completing the resource event, the volume of resources requested/required or the like. In those embodiments of the system 102, in which the resource event is a transaction, the transaction request (i.e., bill/payment demands or the like) data used to determine the optimal time period for communication the electronic communication 460 may include, but is not limited to, the due date for making the payment, the amount due and the like. In addition, in those embodiments in which the resource event request data 610 is used, instructions 410 are further configured to determine 450 the volume of resources 482 required or requested for the impending/current resource event request 480. In such embodiments of the system 102, the electronic communication 460 may be further configured to provide the user notice of the next occurrence of time 462 within the timing pattern (the date on which the user typically conducts the resource event), notice of the impending resource event 464 and the volume 466 of resources required/requested. In those embodiments of the system 102, in which the resource event is a transaction, the instructions 410 are further configured to determine 450 the amount of funds required or requested for payment in the current bill/payment demand and the electronic communication may be additionally configured to notify the user/payor of the due date and amount of payment due in the current bill/payment demand.

Figure 3:
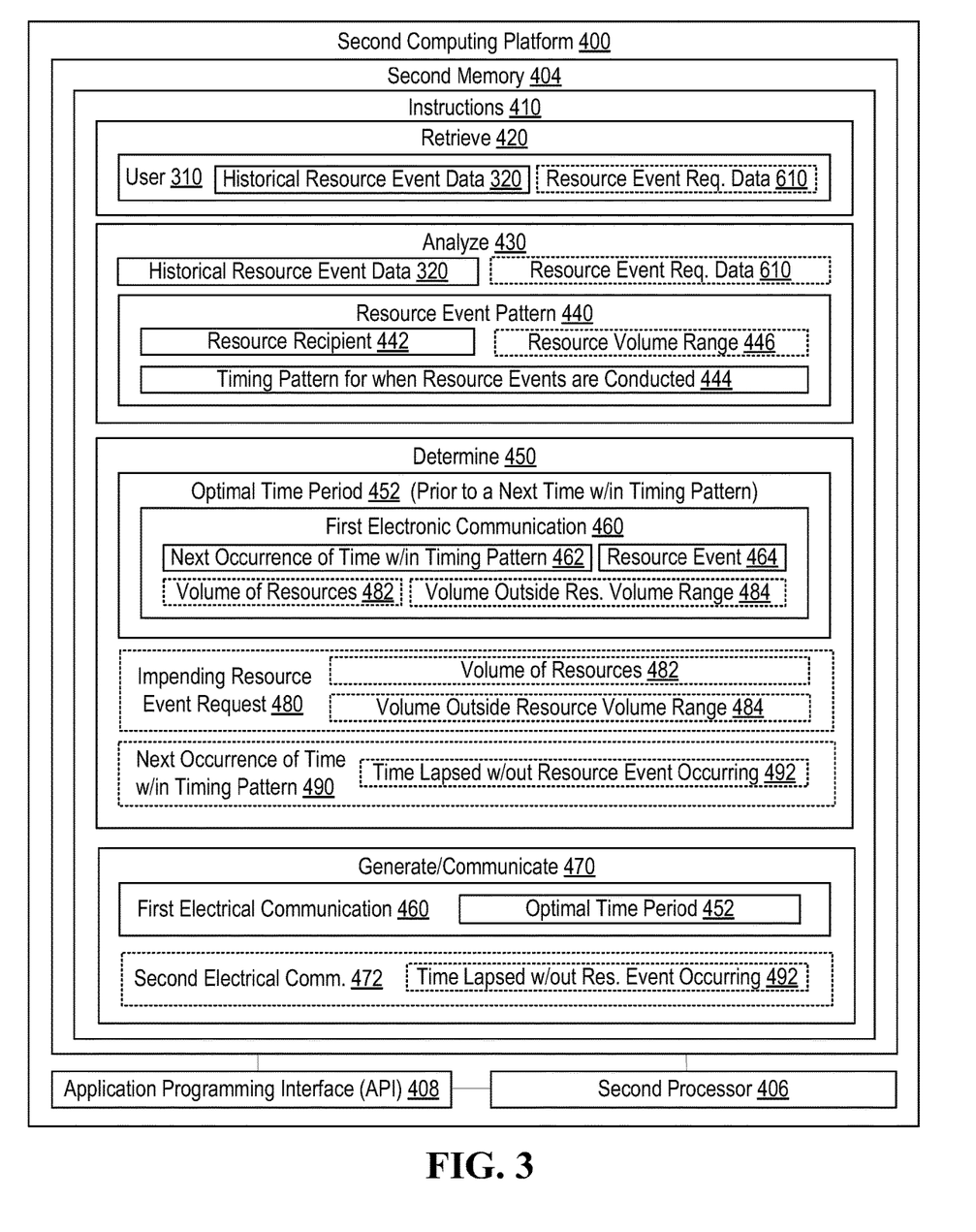
FIG. 3 is a block diagram of a computing platform for resource event pattern recognition for prompting impending resource event requests, in accordance with embodiments of the present invention.

Referring to FIG. 3, depicted is second computing platform 400 configured for resource event pattern recognition for prompting impending resource event requests, in accordance with embodiments of the present invention. In addition to providing greater detail, FIG. 3 highlights various alternative embodiments of the invention. The second computing platform 400 may comprise one or more computing devices (e.g., server(s) 402 or the like) and is configured to execute engines, including instructions, algorithms, modules, routines, applications and the like. As previously noted, second computing platform 400 includes second memory 404 and the like which may comprise volatile and non-volatile memory, such as read-only and/or random-access memory (RAM and ROM), EPROM, EEPROM, flash cards, or any memory common to computing platforms). Moreover, second memory 404 and the like may comprise cloud storage, such as provided by a cloud storage service and/or a cloud connection service.

Further, second computing platform 400 also includes at least one second processor 406, otherwise referred to as a processing device or the like which may be an application-specific integrated circuit ("ASIC"), or other chipset, logic circuit, or other data processing device configured to execute instructions 410. Second processing device(s) 406 or the like may execute one or more application programming interface (APIs) 408 that interface with any resident programs, such as instructions 410 or the like stored in the second memory 404 of the second computing platform 400 and any external programs. Second processing device(s) 406 may include various processing subsystems (not shown in FIG. 3) embodied in hardware, firmware, software, and combinations thereof, that enable the functionality of second computing platform 400 and the operability of second computing platform 400 on the distributed communications network 200 (shown in FIGS. 1 and 2). For example, processing subsystems allow for initiating and maintaining communications and exchanging data with other networked devices, such as first computing platform 300, including database server 302; third computing platform 600 including database server 602; and user device 500 (shown in FIGS. 1 and 2). For the disclosed aspects, processing subsystems of second computing platform 400 may include any processing subsystem used in conjunction with instructions 410 and related engines, tools, routines, sub-routines, algorithms, sub-algorithms, sub-modules thereof.

Second computing platform 400 may additionally include a communications module (not shown in FIG. 3) embodied in hardware, firmware, software, and combinations thereof, that enables electronic communications between second computing platform 400 and other network devices, such as, but not limited to, first computing platform 300, including database server 302; third computing platform 600 including database server 602; and user device 500 (shown in FIGS. 1 and 2). Thus, communication module may include the requisite hardware, firmware, software and/or combinations thereof for establishing and maintaining a network communication connection with one or more network devices.

Memory 404 of second computing platform 400 stores instructions 410 that are executable by second processor(s) 406 and configured to access the first memory 304 of first computing platform 300 to retrieve 420 historical resource event data 320 associated with one of the plurality of users 310 and, in specific embodiments of the invention, access the third memory 604 of third computing platform 600 to retrieve 420 resource event request data 610. The instructions are further configured to analyze 430 the historical resource event data 320 and, in some embodiments the resource event request data 610 to determine at least one resource event pattern 440 associated with the user. As previously noted, analysis may include implementation of AI including ML techniques to recognize resource event patterns 440 based on the historical resource event data 320 and, in specific embodiments, resource event request data 610. The resource event pattern is defined by the resource events in the pattern 440 being conducted with a same resource recipient 442, a timing pattern 444 for when the resource events are conducted with the resource recipient and, in specific embodiments of the invention, a resource volume range 446.

In those specific embodiments of the system in which the resource event is a financial transaction, such as a purchase transaction or the like, the resource event pattern 442 is a transaction pattern, the same resource recipient 442 is a same supplier/merchant/payee, the timing pattern 444 denotes when the transactions within the pattern are conducted and the resource volume range 446 is the range of purchase amounts for the various transactions included within the pattern 444.

Instructions 410 are further configured to determine 450 an optimal time period 452 or specific time prior to the next occurrence of a time within the timing pattern for communicating a first electronic communication 460 to the user 310. The first electronic communication 460 is configured to notify the user 310 of the next occurrence of time 462 within the timing pattern and an impending resource event 464 that meets the criteria of the resource event pattern 440. For example, in those embodiments of the system in which the resource event is a transaction, the electronic communication 460, which may comprise an alert, such as a Short message Service (SMS)/text message, an electronic mail (email), voice mail or the like may notify the user/purchaser/payor of the impending transaction and that the user typically conducts the transaction on specific date or a specific number of days prior to the due date for the transaction/payment or the like. In such embodiments of the invention the optimal time period 452 may be a time period during which the electronic communication 460 may be most effective in notifying the user of the impending transaction and the date on which they typically conduct the transaction. For example, if the user typically remits payment to a utility company or the like seven days before the payment is due, the optimal time period 452 for communicating the electronic communication 460 may be within one day of the date on which the user typically conducts the transaction (e.g., eight days before the payment is due or the like). In other instances, user inputs/suggestions for when they desire the electronic notifications 460 may factor in or be the overriding factor in determining the optimal time period 452. Moreover, in certain instances the optimal time period 452 may be within a specified day/week/month or the like, while in other instances the optimal time period 452 may be within a specified hour or period of hours within a specified day or the like. Other factors for determining the optimal time period may include, but are not limited to, current volume of resources required for the impending resource event 464, volume of resources currently available to the user and the like. For example, a user may desire more lead time between they receive the electronic communication 460 and when they typically conduct such a resource event if the volume of resources required for the impending resource event 464 is higher than normal and/or the volume of resources currently available to the user is less than the volume of resources required for the impending resource event 464.

Further, instructions 450 are configured to generate and communicate 470, within the optimal time period 452, the first electronic communication 460, which serves to notify the user that time for which they typically conduct the resource event is imminent 462 and that an impending resource event 464 is required or otherwise coming due. Additionally, in other embodiments of the invention, the communication 460 serves to notify the user as to the volume of resources 482 required for conducting the impending resource event and, if necessary, that the volume of resources is outside of the resource volume range 484 of other previous resource events included in the resource event pattern 440. In other specific embodiments of the invention, instructions 450 are configured to generate and communicate 470, a second electronic communication 472 to the user, which serves to notify the user that the time in which they typically conduct the resource event has lapsed 492 without the resource event occurring.

Figure 4:
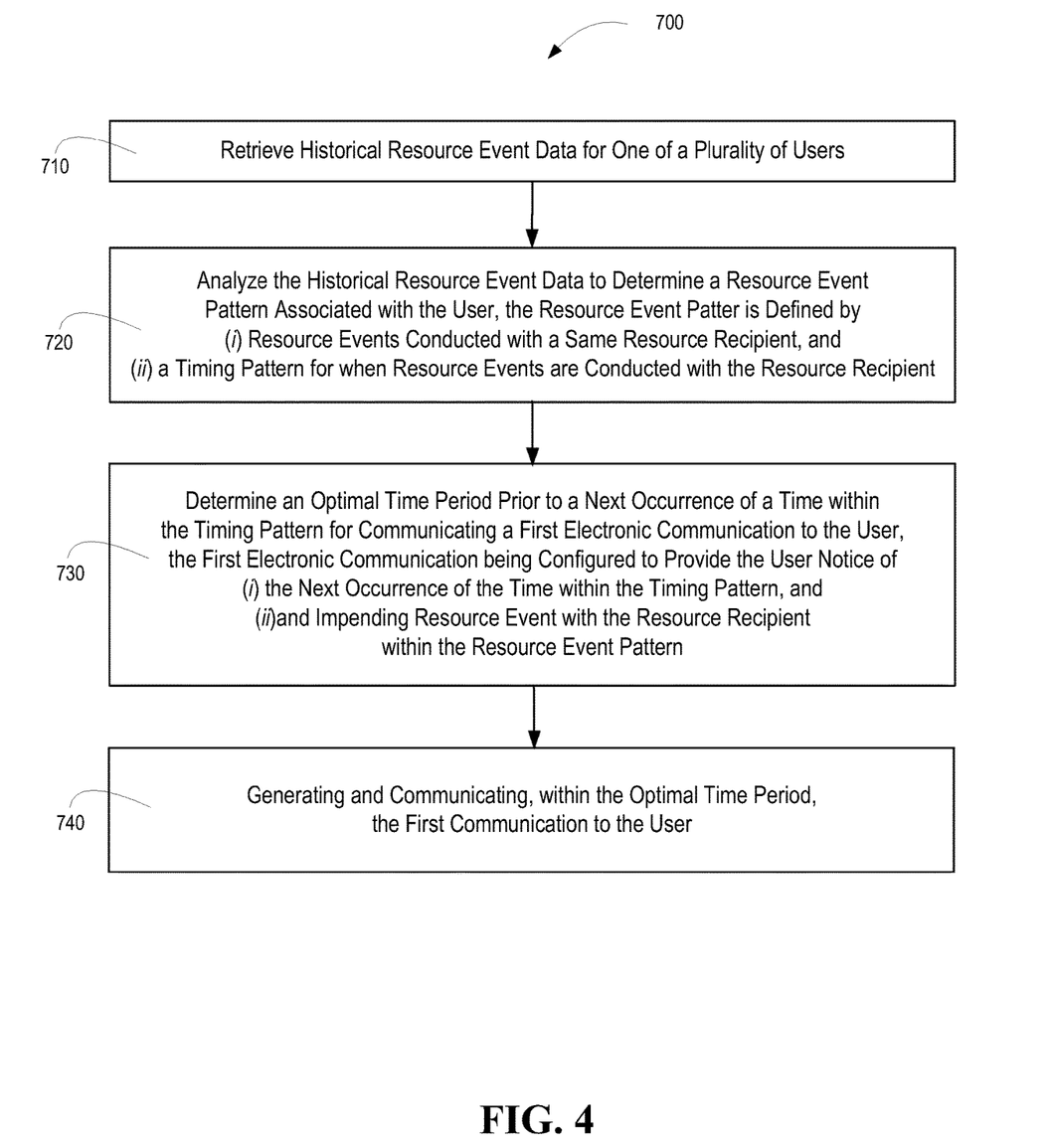
FIG. 4 is a flow diagram of a method for resource event pattern recognition for prompting impending resource event requests, in accordance with embodiments of the present invention.

Referring to FIG. 4 a flow diagram is presented of a method 700 for resource event pattern recognition for prompting impending resource event requests, in accordance with embodiments of the present invention. At Event 710, historical resource event data and, in some embodiments historical and/or current resource event request data is retrieved for one of a plurality of users/resource providers. In specific embodiments of the invention, in which the resource events are financial transactions, the historical resource event data is historical transaction data and the resource event request data is historical or current/pending payment requests/bills.

At Event 720, the historical resource event data and, in some embodiments of the method, the resource event request data is analyzed to determine at least one resource event pattern associated with the user. Analysis may include implementation of AI including ML techniques to recognize/identify resource event patterns based on the historical resource event data and, in some embodiments of the method the resource event request data. The resource event pattern is defined by the resource events in the pattern being conducted with a same resource recipient and a timing pattern for when the resource events are conducted with the resource recipient. In additional embodiments of the method, the timing pattern may further be defined by a resource volume range that identifies the range of volume of resources used in conducting the events in the pattern.

At Event 730, an optimal time period/time is determined for communicating a first electronic communication (e.g., email, text, voice mail or the like) to the user/resource provider. The optimal time period/time occurring prior to the next occurrence of a time within the timing pattern. For example, if the timing pattern indicates that the resource events occur about seven days prior to the resource event request date, the optimal time period time, will be beyond seven days prior (e.g., eight days prior or the like). The optimal time period is determined based on the timing pattern in the resource event pattern and, in other instances, specific factors, such as user preferences, resource volume required in the current resource event request, variance between the resource volume required in the current resource event request and the resource volume range of the resource events in the pattern, resource volume currently available to the user and the like. The first electronic communication is configured to notify the user of the resource event request, the next occurrence of the time within the timing pattern and, in some embodiments, the resource volume required for the pending resource event request and, when applicable, the resource volume required for the pending resource event request being outside the resource volume range of events in the pattern and/or provide a link for initiating the resource event. In further embodiments of the method, the electronic communication may include suggestions for alternate resource event vehicles which may be used to conduct the resource event. For example, if a resource event vehicle used in one of the previous resource events in the pattern has expired or is otherwise ineffective or if another resource event vehicle would benefit the user, the alternate resource event vehicle may suggested to the user in the electronic communication.

At Event 740, the first electronic communication is generated and communicated, within the optimal time period or at the optimal time, to the user, such that the user can act upon the notification and conduct the resource event in accordance with the identified resource event pattern.

As evident from the preceding description, the systems, methods and the like described herein represents an improvement in technology, specifically, identifying patterns in previously conducted resource events, specifically patterns that indicate a timing pattern for conducting resource events. Based at least on the timing pattern, an optimal time is determined for communicating a notification to the user that is configured to notify a user that a next occurrence of a time within the timing pattern is imminent and that a resource event within the resource event pattern is pending. The optimal time may be close in proximity (e.g., within one day) of the next occurrence of the time within the timing pattern or, depending on other factors, such as user preference, resource volume due, resource volume availability, resource volume due in comparison to typical resource volume due, the optimal time may be farther out from the next occurrence of a time within the timing pattern.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A system for resource event pattern recognition for prompting impending resource event requests, the system comprising:

a first computing platform including a first memory and at least one first processing device in communication with the first memory, wherein the first memory stores historical resource event data for each of a plurality of users; and a second computing platform including a second memory and at least one second processing device in communication with the second memory, wherein the second memory stores instructions that are executable by the second processing device and configured to:

access the first memory to retrieve historical resource event data for one of the plurality of users, analyze the historical resource event data to determine a resource event pattern associated with the user, wherein the resource event pattern is defined by (i) resource events conducted with a same resource recipient, and (ii) a timing pattern for when the resource events are conducted with the resource recipient, determine an optimal time period prior to a next occurrence of a time within the timing pattern for communicating a first electronic communication to the user, wherein the first electronic communication is configured to provide the user notice of (i) the next occurrence of the time within the timing pattern, and (ii) an impending resource event with the resource recipient, and generate and communicate, within the optimal time period, the first electronic communication to the user, determine that the next occurrence of the time within the timing pattern has lapsed without the user conducting a resource event with the resource recipient, and generate a second electronic communication and communicate the second electronic communication to the user, wherein the second electronic communication is configured to notify the user that the time within the timing pattern has lapsed without the user conducting the resource event with the resource recipient.

2. The system of claim 1, wherein the instructions configured to determine are further configured to:

determine the optimal time period prior to the next occurrence of the time within the timing pattern for communicating a first electronic communication to the user, wherein the optimal time period is within one day prior to the next occurrence of the time within the timing pattern.

3. The system of claim 1, wherein the instructions configured to analyze are further configured to:

analyze the historical resource event data to determine the resource event pattern associated with the user, wherein the resource event pattern is defined further by (iii) the resource events being within a resource volume range.

4. The system of claim 3, wherein the first electronic communication is further configured to provide the user notice of (iii) the resource volume range.

5. The system of claim 1, further comprising:

a third computing platform including a third memory and at least one third processing device in communication with the third memory, wherein the third memory stores resource event request data for each of the plurality of users.

6. The system of claim 5, wherein the instructions are further configured to:

access the third memory to retrieve resource event request data for the user, and determine, from the resource event request data, one or more resource event requests for resource events between the user and the resource recipient, wherein the instructions configured to analyze are further configured to:

analyze the historical resource event data and the one or more resource event requests to determine the timing pattern for the resource event pattern.

7. The system of claim 5, wherein the instructions are further configured to:

access the third memory to retrieve resource event request data for the user, determine, from the resource event request data, an impending resource event request for an upcoming resource event to be conducted between the user and the resource recipient, determine a volume of resources requested for transfer in the impending resource event request, and wherein the first electronic communication is further configured to provide the user notice of (iii) the volume of resources requested for transfer in the impending resource event request.

8. The system of claim 5, wherein the instructions configured to analyze are further configured to:

analyze the historical resource event data to determine the resource event pattern associated with the user, wherein the resource event pattern is defined further by (iii) the resource events being within a resource volume range.

9. The system of claim 8, wherein the instructions are further configured to:

access the third memory to retrieve resource event request data for the user, determine, from the resource event request data, an impending resource event request for a resource event to be conducted between the user and the resource recipient, determine that a volume of resources requested for transfer in the impending resource event request is outside of the resource volume range, and wherein the first electronic communication is further configured to provide the user notice of (iii) the volume of resources requested for transfer in the impending resource event request is outside of the resource volume range.

10. A computer-implemented method for resource event pattern recognition for prompting impending resource event requests, the computer-implemented method is executable by one more processing devices and comprising:

retrieving historical resource event data for one of a plurality of users, analyzing the historical resource event data to determine a resource event pattern associated with the user, wherein the resource event pattern is defined by (i) resource events conducted with a same resource recipient, and (ii) a timing pattern for when the resource events are conducted with the resource recipient, and determining an optimal time period prior to a next occurrence of a time within the timing pattern for communicating a first electronic communication to the user, wherein the first electronic communication is configured to provide the user notice of (i) the next occurrence of the time within the timing pattern, and (ii) an impending resource event with the resource recipient;

generating and communicating, within the optimal time period, the first electronic communication to the user;

determining that the next occurrence of the time within the timing pattern has lapsed without the user conducting a resource event with the resource recipient; and generating a second electronic communication and communicate the second electronic communication to the user, wherein the second electronic communication is configured to notify the user that the time within the timing pattern has lapsed without the user conducting the resource event with the resource recipient.

11. The computer-implemented method of claim 10, wherein determining further comprises:
    determining the optimal time period prior to the next occurrence of the time within the timing pattern for communicating a first electronic communication to the user, wherein the optimal time period is within one day prior to the next occurrence of the time within the timing pattern.

12. The computer-implemented method of claim 10, wherein analyzing further comprises:
    analyzing the historical resource event data to determine the resource event pattern associated with the user, wherein the resource event pattern is defined further by (iii) the resource events being within a resource volume range, and
    wherein the first electronic communication is further configured to provide the user notice of (iii) the resource volume range.

13. The computer-implemented method of claim 10, further comprising:
    retrieving resource event request data for the user, and
    determining, from the resource event request data, one or more resource event requests for resource events between the user and the resource recipient,
    wherein analyzing further comprises:
    analyzing the historical resource event data and the one or more resource event requests to determine the timing pattern for one or more of the resource event patterns.

14. The computer-implemented method of claim 10, further comprising:
    retrieving resource event request data for the user,
    determining, from the resource event request data, an impending resource event request for an upcoming resource event to be conducted between the user and the resource recipient,
    determining a volume of resources requested for transfer in the impending resource event request, and
    wherein the first electronic communication is further configured to provide the user notice of (iii) the volume of resources requested for transfer in the impending resource event request.

15. The computer-implemented method of claim 10, wherein analyzing further comprises:
    analyzing the historical resource event data to determine the resource event pattern associated with the user, wherein the resource event pattern is defined further by (iii) the resource events being within a resource volume range, and
    the computer-implemented method further comprises:
    retrieving resource event request data for the user,
    determining, from the resource event request data, an impending resource event request for an upcoming resource event to be conducted between the user and the resource recipient, and
    determining that a volume of resources requested for transfer in the impending resource event request is outside of the resource volume range,
    wherein the first electronic communication is further configured to provide the user notice of (iii) the volume of resources requested for transfer in the impending resource event request is outside of the resource volume range.

16. A computer program product comprising non-transitory computer-readable storage medium that includes:
    a first set of codes for causing a computer processing device to retrieve historical resource event data for one of a plurality of users,
    a second set of codes for causing a computer processing device to analyze the historical resource event data to determine a resource event pattern associated with the user, wherein the resource event pattern is defined by (i) resource events conducted with a same resource recipient, and (ii) a timing pattern for when the resource events are conducted with the resource recipient, and
    a third set of codes for causing a computer processing device to determine an optimal time period prior to a next occurrence of a time within the timing pattern for communicating a first electronic communication to the user, wherein the first electronic communication is configured to provide the user notice of (i) the next occurrence of the time within the timing pattern, and (ii) an impending resource event with the resource recipient;
    a fourth set of codes for causing a computer to generate and communicate, within the optimal time period, the first electronic communication to the user;
    a fifth set of codes for causing a computer to determine that the next occurrence of the time within the timing pattern has lapsed without the user conducting a resource event with the resource recipient, and
    a sixth set of codes for causing a computer to generate a second electronic communication and communicate the second electronic communication to the user, wherein the second electronic communication is configured to notify the user that the time within the timing pattern has lapsed without the user conducting the resource event with the resource recipient.

17. The computer program product of claim 16, wherein the third set of codes are further configured to cause the computer processing device to determine the optimal time period prior to the next occurrence of the time within the timing pattern for communicating a first electronic communication to the user, wherein the optimal time period is within one day prior to the next occurrence of the time within the timing pattern.

18. The computer program product of claim 16, wherein the second set of codes is further configured to cause the computer processing device to analyze the historical resource event data to determine the resource event pattern associated with the user, wherein the resource event pattern is defined further by (iii) the resource events being within a predetermined resource volume range, and
    wherein the electronic communication is further configured to provide the user notice of (iii) the resource volume range.

19. The computer program product of claim 16, wherein the computer-readable storage medium further comprises:
    a seventh set of codes for causing a computer processing device to retrieve resource event request data for the user; and
    an eighth set of codes for causing a computer processing device to determine, from the resource event request data, one or more resource event requests for resource events between the user and the resource recipient,
    wherein the second set of codes is further configured to cause the computing processing device to analyze the historical resource event data and the one or more resource event requests to determine the timing pattern for one or more of the resource event patterns.

\* \* \* \* \*